(12) United States Patent
Shao et al.

(10) Patent No.: US 7,242,175 B2
(45) Date of Patent: Jul. 10, 2007

(54) DETERMINING ROTATION OF A FREEWHEELING MOTOR

(75) Inventors: Jianwen Shao, Rolling Meadows, IL (US); Thomas L. Hopkins, Mundelein, IL (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/637,985

(22) Filed: Aug. 8, 2003

(65) Prior Publication Data

US 2005/0030002 A1    Feb. 10, 2005

(51) Int. Cl.
G01R 25/00    (2006.01)

(52) U.S. Cl. .............. 324/76.77; 324/207.25; 318/439

(58) Field of Classification Search ........... 318/254, 318/439, 256–263; 388/805; 324/76.77, 324/207.25
See application file for complete search history.

(56) References Cited

U.S. PATENT DOCUMENTS

| | | | | |
|---|---|---|---|---|
| 4,384,240 A | * | 5/1983 | Sloan | 318/255 |
| 4,788,497 A | | 11/1988 | Katsumura | 324/177 |
| 5,327,053 A | * | 7/1994 | Mann et al. | 318/254 |
| 5,631,999 A | * | 5/1997 | Dinsmore | 388/805 |
| 5,767,654 A | | 6/1998 | Menegoli et al. | 318/811 |
| 5,859,520 A | | 1/1999 | Bourgeois et al. | 318/805 |
| 6,091,171 A | | 7/2000 | Ohishi et al. | 310/68 B |
| 8,348,790 | | 2/2002 | Aler et al. | 324/207.25 |
| 6,369,534 B1 | | 4/2002 | Menegoli | |
| 6,437,525 B1 | | 8/2002 | Menegoli | |
| 6,498,446 B1 | | 12/2002 | Menegoli et al. | |
| 6,541,928 B2 | | 4/2003 | Eroglu et al. | |
| 6,598,000 B1 | | 7/2003 | Menegoli et al. | |
| 6,653,805 B2 | | 11/2003 | Menegoli | |
| 2003/0098666 A1 | | 5/2003 | Shao | 318/727 |

OTHER PUBLICATIONS

U.S. Appl. No. 10/608,273, Shao.

* cited by examiner

*Primary Examiner*—Vincent Q. Nguyen
(74) *Attorney, Agent, or Firm*—Lisa K. Jorgenson; Bryan A. Santarelli (57) ABSTRACT

A device and method that determine a freewheeling rotation of an electric motor. The method includes steps of measuring first and second signals from respective first and second windings of an unenergized motor, and determining from the first and second signals whether the unenergized motor is rotating. The method may also include determining from the first and second signals the direction of rotation if the unenergized motor is rotating. The method may further include measuring a third signal from a third winding of the unenergized motor, and determining whether the motor is rotating may include determining that the motor is not rotating if the first, second, and third signals are equal. The first and second signals may each include a respective back voltage.

32 Claims, 10 Drawing Sheets

DETERMINING ROTATION OF A FREEWHEELING MOTOR

TECHNICAL FIELD

An embodiment of the present invention relates generally to electric motor driving and control circuitry, and is more specifically related to an apparatus and method for determining a rotation direction of a sensorless freewheeling motor by comparing signals induced in the motor windings.

BACKGROUND

Motors are found in many forms. For the purposes of discussion, a three-phase, brushless DC motor ("BLDC motor") is described. Three-phase brushless DC motors have many uses, among which include both high-speed and low-speed applications. Conventional high-speed applications include spindle motors for computer hard disk drivers, digital versatile disk (DVD) drivers, CD players, tape-drives for video recorders, and blowers for vacuum cleaners. Motors for high-speed applications typically operate in a range from a few thousand rotations per minute (rpm's) to 20,000 rpm's, for example. Low-speed applications include motors for farm and construction equipment, automobile engine cooling fans, HVAC compressors, fuel pumps and the like. Motors for low-speed applications typically operate in a range from less than a few hundred rpm's to a few thousand rpm's, for example. Compared to motors employing brushes, brushless motors enjoy reduced noise generation and improved reliability because no brushes need to be replaced due to wear.

Figure 1:
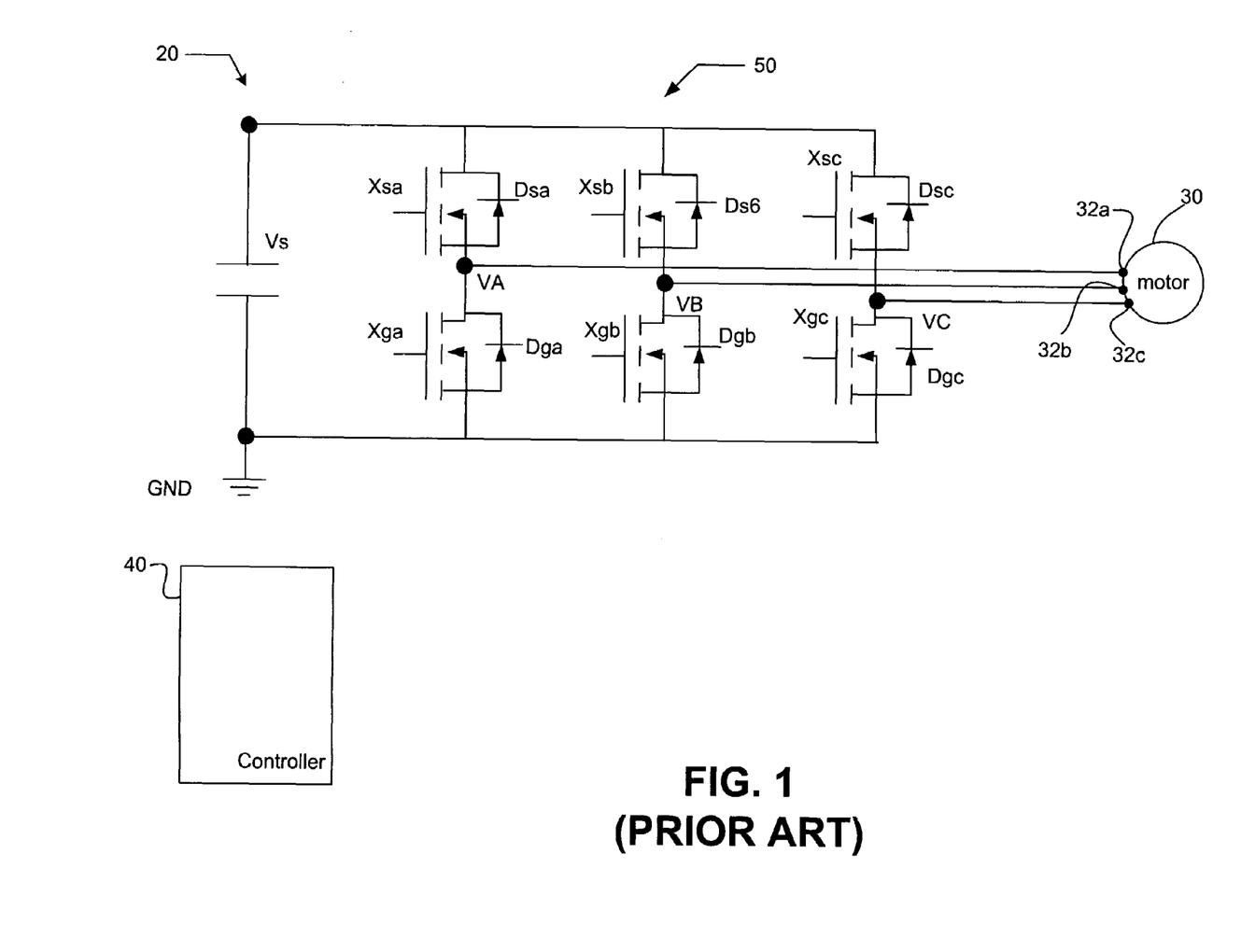
FIG. 1 illustrates a conventional motor system that includes a sensorless brushless DC (BLDC) motor, a controller, a power supply, and a power-supply control circuitry.

FIG. 1 illustrates a motor system 20 that includes a sensorless BLDC motor 30, a controller 40, a power-supply Vs and a power-supply control circuit 50. The motor 30 typically includes a permanent magnet rotor and a stator having a number of windings, with the rotor typically housed within the stator. Each winding has a winding tap 32 used to couple the windings to the power-supply control circuit 50. The rotor is permanently magnetized, and turns to align its own magnetic flux with the magnetic flux generated by the windings. The voltage signals at the winding tap 32a, 32b, and 32c are represented as voltages Va, Vb, Vc, respectively.

The power-supply control circuit 50 includes a plurality of pairs of switches Xsa and Xga, Xsb and Xgb, and Xsc and Xbc (collectively "switches X"), one pair for each winding. Each of the switches X is connected to a free end of a winding at the winding tap 32a–32c, and either to the power supply Vs Qr to a ground voltage GND. The switches are typically power transistors such as Mosfets or the like. Reverse biased diodes Dsa, Dga, Dsb, Dgb, Dsc, Dgc (collectively "diode(s) D") are placed either in parallel with each of these switches or are inherent in the structure of the switches. The diodes D act as power rectifiers, and typically serve to protect the switches X and the motor windings against induced voltages exceeding the supply or ground voltage.

The controller 40 controls and operates the switches X to power the motor 30, typically in a pulse width modulation (PWM) mode. Connecting wires between the controller 40 and the power-supply control circuitry 50 are omitted for clarity. The PWM mode is a mode of operation in which the power is switched on and off at a high frequency in comparison to the angular velocity of the rotor. For example, typical switching frequencies may be in the range of 20 kHz for low-speed applications. In a typical on-off cycle lasting about 50 µS, there may be 40 µS of "on" time followed by 10 µS of "off" time. Given the short duration of off times, residual current still flows through the motor windings so there is virtually no measurable slow down in the angular velocity of the rotor during these periods. Accordingly, because the switches are either full "on" or full "off," the PWM mode provides a significant power savings over modes in which power is continuously supplied.

The BLDC motor 30 can be represented as having three windings A, B, and C (not shown in FIG. 1), although a larger number of stator windings are often employed with multiple rotor poles. The windings can be connected in a "Wye" configuration, or alternatively in a "Delta" configuration. Typically, in such applications, eight-pole motors are used having twelve stator windings and four N-S magnetic sets on the rotor, resulting in four electrical cycles per revolution of the rotor. The stator windings, however, can be analyzed in terms of three "Wye" connected windings, connected in three sets of four windings, each physically separated by 90 degrees.

In operation, the three representative windings A, B and C are energized with a PWM drive signal that causes electromagnetic fields to develop about the windings. The resulting attraction/repulsion between the electromagnetic fields of the windings A, B, and C, and the magnetic fields created by the magnets in the rotor causes the rotor assembly to rotate. The windings are energized in sequences to produce a current path through two windings of the "Wye", with the third winding left floating (or in tri-state). The sequences are arranged so that as the current paths are changed, or commutated, one of the windings of the current path is switched to float, and the previously floating winding is switched into the current path. The sequences are defined such that when the floating winding is switched into the current path, the direction of the current in the winding that was included in the prior current path is not changed.

The start-up routine for a BLDC motor 30 is handled by the controller 40 and consists of several phases, including pre-positioning the rotor, accelerating the rotor up to a desired speed, and switching to auto-commutated mode, or synchronous mode once the desired speed is reached. In some situations, the BLDC motor 30 may be freewheeling, that is rotating without being driven by the controller 40 before the controller is activated to start and drive the motor. For example, windmilling by an automotive HVAC or engine cooling fan will make the fan motor rotate. Windmilling occurs when air blows across the fan blades, thus causing an unenergized fan motor to rotate. Other situations may occur where the motor 30 is rotating for a reason other than being driven by the controller 40. It is often important to detect the motor 30 rotation direction before beginning the start-up routine. If at the beginning of the start-up routine the motor 30 is turning for a reason other than being driven by the controller 40, the start-up may fail. In addition, the controller 40 or the circuit 50 may be damaged because a high current may flow to the controller 40 if it tries to start the motor 30 while it is rotating in a direction opposite to the desired direction. Further, if the motor 30 is already rotating in a desired direction, the rotation should be preserved rather than losing efficiency by stopping and restarting the motor. Ideally, the controller 40 should "know" the motor 30 rotation in advance of the start-up routine. If the rotation is in the desired direction, then the controller 40 should pick up the speed right away. If the rotation is in the opposite direction, the controller 40 should brake or stop the motor 30 first, and then start the motor in desired direction.

An existing method for determining a pre-start rotation of a motor requires a plurality of sensors installed within the motor structure. Such sensors add components and complexity to a motor system that are used only during motor start up. Therefore, a need exists for an apparatus and a method of determining the rotation direction of a freewheeling motor that requires few or no additions to and little or no alteration of the motor structure.

SUMMARY

In an embodiment of the invention, a method of determining a freewheeling rotation of an electric motor is provided. The method includes the steps of measuring first and second signals from respective first and second windings of an unenergized motor, and determining from the first and second signals whether the unenergized motor is rotating. The method may also include determining from the first and second signals the direction of rotation if the unenergized motor is rotating. The method may further include measuring a third signal from a third winding of the unenergized motor, and determining whether the motor is rotating comprises determining that the motor is not rotating if the first, second, and third signals are equal. The first and second signals may each comprise a respective back-emf voltage.

In another embodiment of the invention, an electric motor controller is provided that determines a freewheeling rotation of an electric motor. The controller includes operability to measure first and second signals from respective first and second windings of an unenergized motor, and determine from the first and second signals whether the unenergized motor is rotating. The controller may further include operability to determine from the first and second signals a freewheeling direction of rotation if the unenergized motor is rotating. The controller may also include operability to measure a third signal from a third winding of the unenergized motor, and if the first, second, and third signals are equal, determine that the motor is not rotating. The controller may further include operability to close a switch that grounds a third winding of the unenergized motor while measuring the first and second signals. The controller may include operability to close a second switch that grounds the second winding and a third switch that grounds a third winding of the unenergized motor while measuring the first signal, and close a first switch that grounds the first winding and a third switch that grounds the third winding while measuring the second signal.

These and various other features as well as advantages of one or more embodiments of the present invention will be apparent from a reading of the following detailed description and a review of the associated drawings.

DETAILED DESCRIPTION

Figure 2:
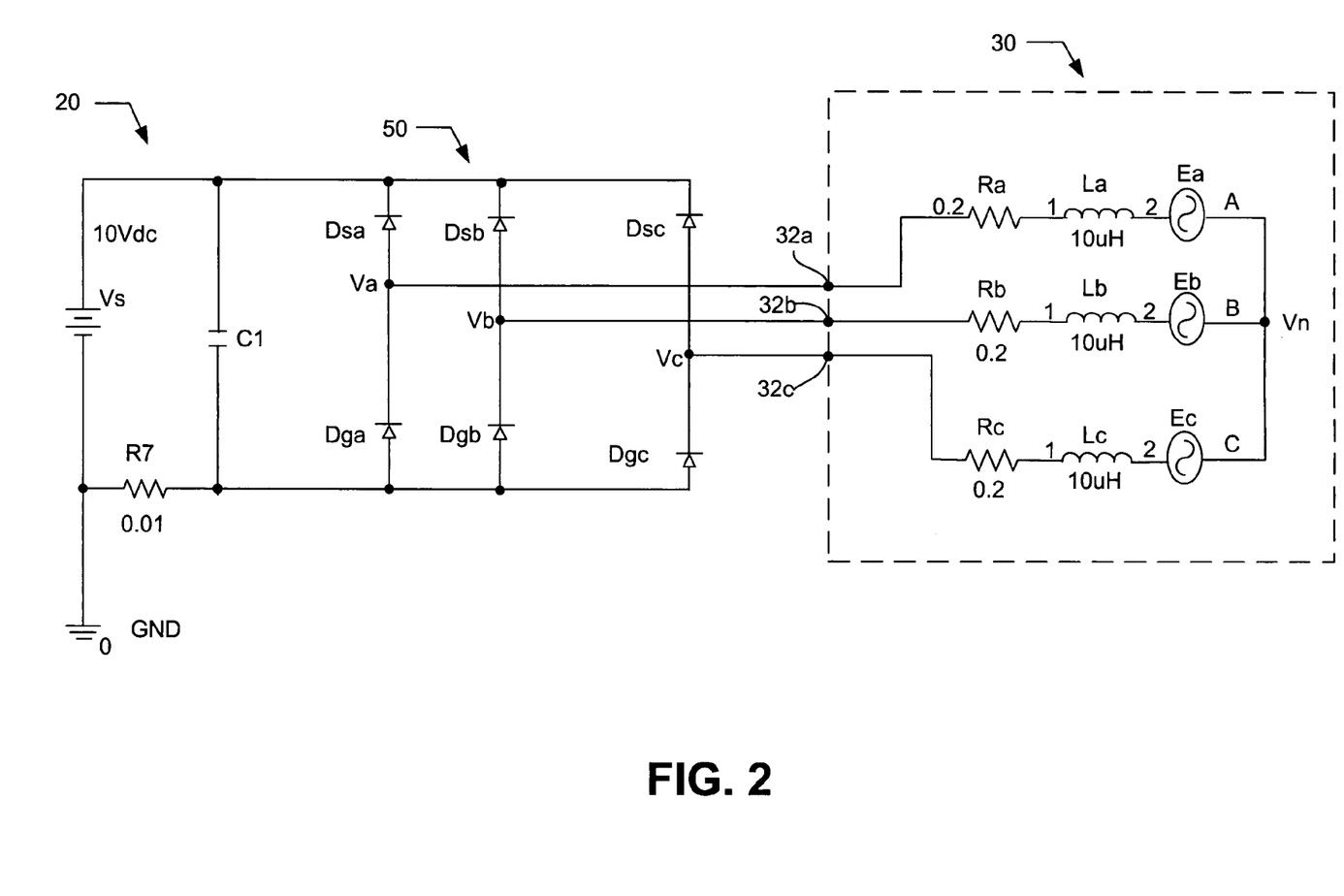
FIG. 2 is a model of the BLDC motor and the power supply circuit of FIG. 1, when the motor is not being energized by the controller and where the 20 freewheeling direction is determined according to an embodiment of the invention.

FIG. 2 is a model of the BLDC motor 30 and the power supply 50 of the motor system 20 of FIG. 1, where the motor 30 is not being energized by the controller 40. As illustrated in FIG. 2, in a non-energized state, none of the power transistors forming the switches Xsa, Xga, Xsb, Xgb, Xsc, Xbc are on. As a result, the diodes D are the only active electrical components in the circuit 50. The windings A, B, and C of the motor 30 are each schematically modeled as a BEMF voltage source E, a coil L, and a resistor R. The windings A, B, and C are all connected together at common node Vn, and have respective winding taps 32a, 32b, and 32c.

Figure 3A:
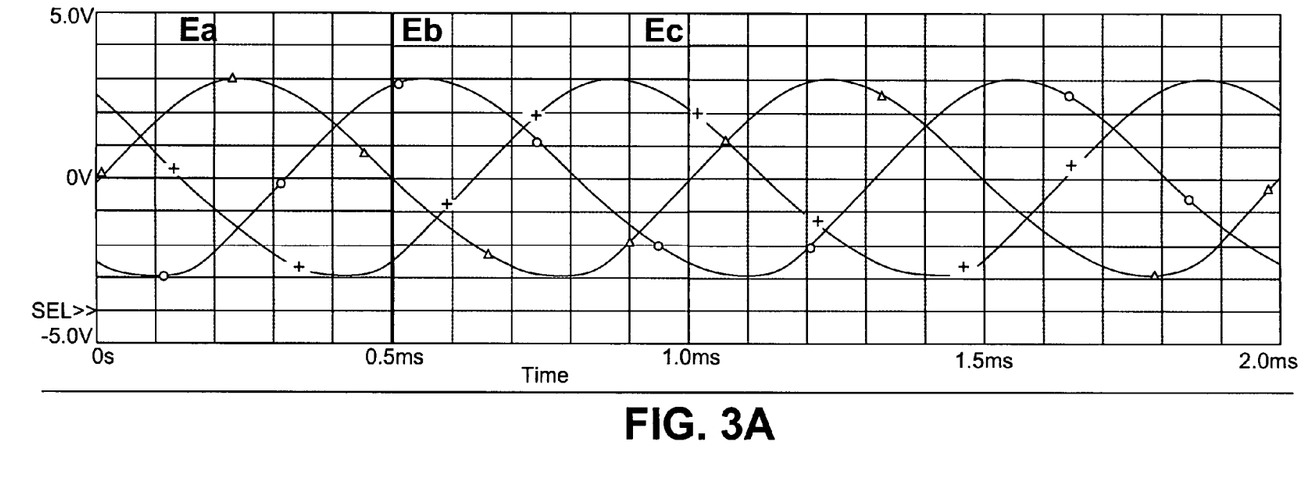
FIG. 3a is a plot of freewheeling induced BEMF sinusoidal voltages Ea, Eb, and Ec in the motor of FIG. 2.
Figure 3B:
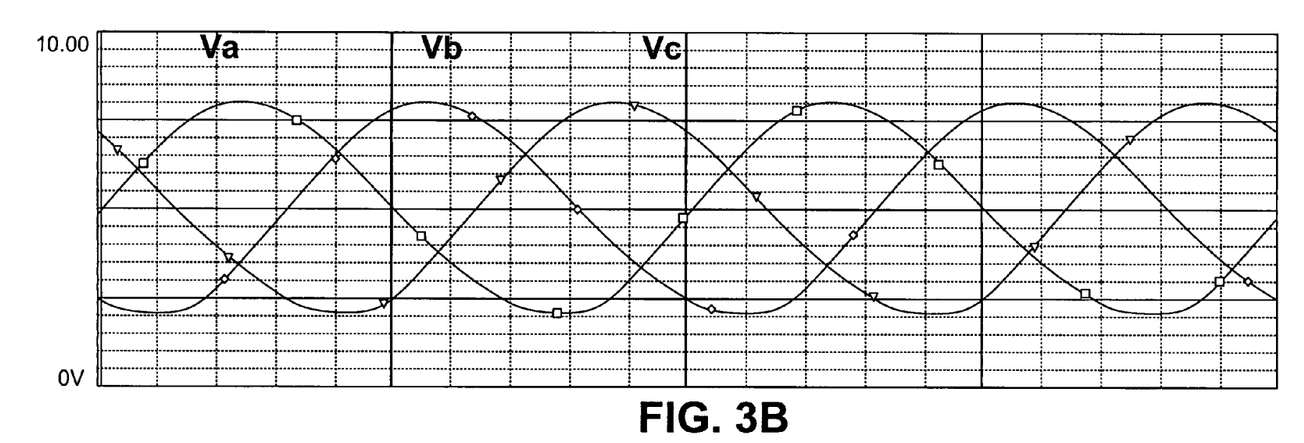
FIG. 3b is a plot of freewheeling induced sinusoidal tap voltages Va, Vb, and Vc.

When the motor 30 freewheels, it induces sinusoidal BEMF voltages Ea, Eb, and Ec in the respective windings A, B, and C as illustrated in FIG. 3a. When the windings A, B, and C are spaced equally about the stator, the phases of the voltages Ea, Eb, and Ec will be 120 degrees apart as shown in FIG. 3a. For a freewheeling rotation in a first direction from winding A to winding B and to winding C (A-B-C), the voltage Eb rising-edge zero-crossing will lag the voltage Ea rising-edge zero-crossing by 120 degrees, and the voltage Ec rising-edge zero-crossing will lag the voltage Eb rising-edge zero-crossing by another 120 degrees. Consequentially, when the rising-edge of the voltage Ea crosses zero, one can read the levels of the voltage signals Eb and Ec relative to zero to determine the direction of the freewheeling rotation. However, because of the diodes D in the circuit 50, the induced voltage signals Va, Vb, and Vc read at the winding taps 32a–32c are offset above ground such that these voltage signals do not have zero-crossings as illustrated in FIG. 3b.

In one embodiment, dedicated windings for sensing freewheeling induced signals could be added to the motor 30 that are independent of the windings used to rotate the motor 30. However, such an alternative embodiment is less preferable than using the existing motor windings because of increased complexity and required structural modification of the motor 30.

Figure 4:
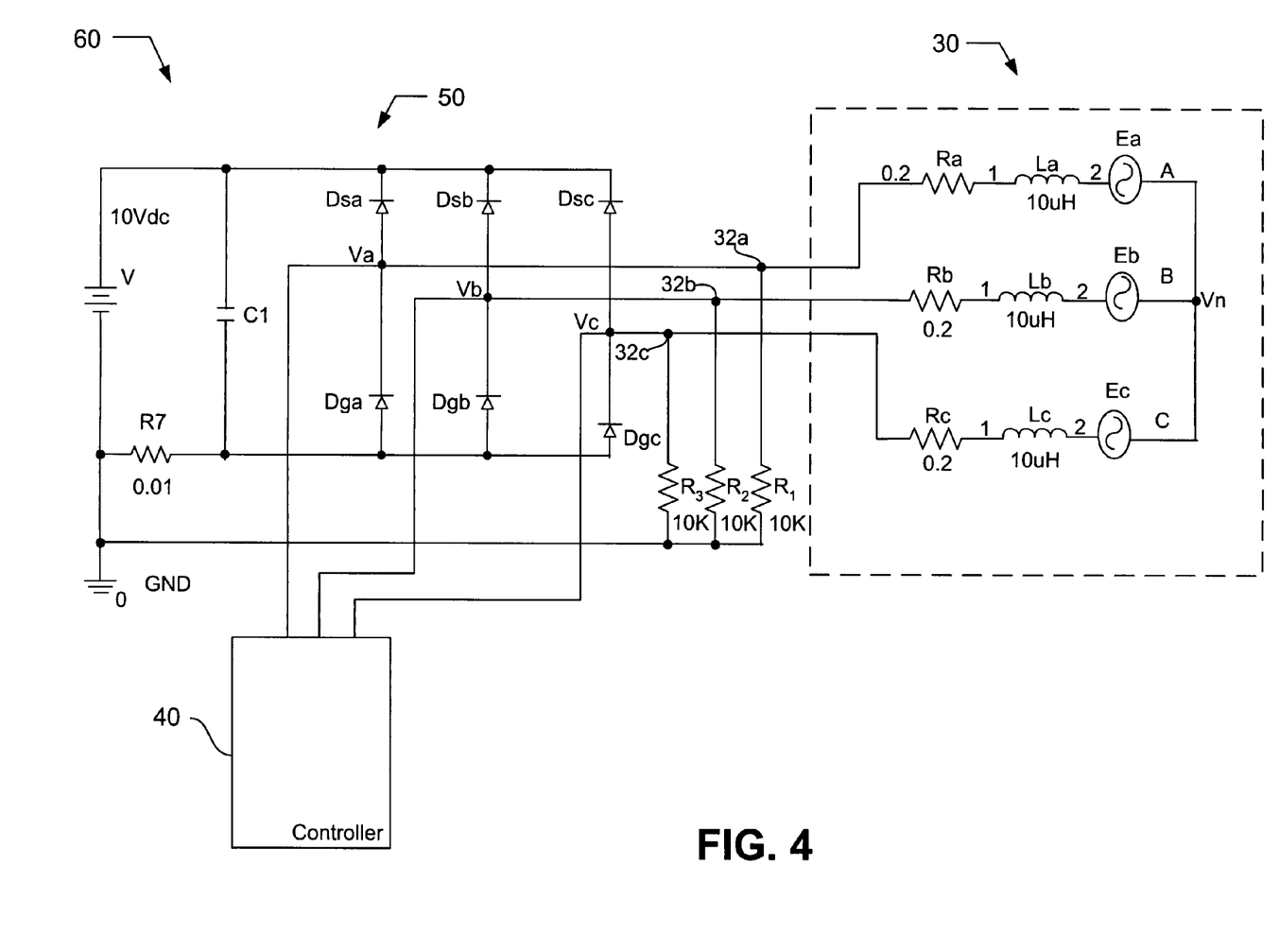
FIG. 4 is a model of a BLDC motor system that includes resistors coupling the winding taps to ground according to an embodiment of the invention.

FIG. 4 is a schematic model of a motor system 60 that includes resistors R1, R2, and R3 coupling winding taps 32a, 32b, and 32c, respectively, to ground GND, according to an embodiment of the invention. The motor system 60 is otherwise substantially similar to the motor system 20 of FIG. 1 and in the same state as modeled in FIG. 2 where none of the switches X are turned on, and thus the motor is unenergized. The resistors R1, R2, and R3 pull the induced terminal voltage signals Va, Vb, and Vc at the winding taps 32a–32c to the ground GND. In one embodiment, the resistors R1, R2, and R3 have an equal value, and are illustrated in FIG. 4 as 10K ohms each. The resistors R1, R2, and R3 however, can have any suitable value consistent with the electrical properties of the motor 30 and the controller 50, and, typically, will be in a range between 10K and 100K ohms. These resistors can also have unequal values. The resistors R1, R2, and R3 can be physically located anywhere in the motor system 60, including mounted to the motor 30, the power-supply control circuit 50, or the controller 40.

Figure 5:
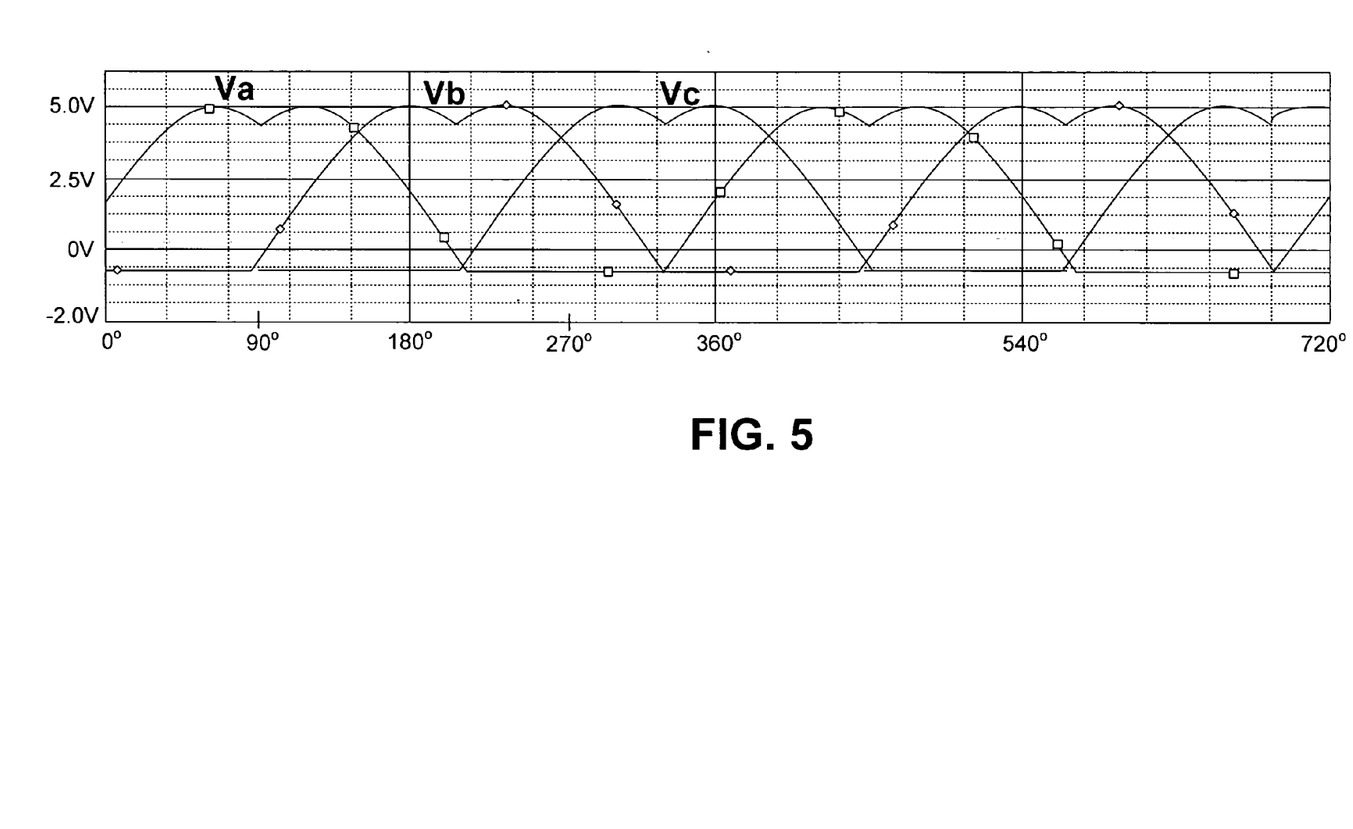
FIG. 5 is a plot of freewheeling induced sinusoidal tap voltages Va, Vb, and Vc of the motor system of FIG. 4 according to an embodiment of the invention.

FIG. 5 is a plot of freewheeling induced sinusoidal tap voltages Va, Vb, and Vc of the motor system of FIG. 4 according to an embodiment of the invention. The addition of the resistors R1, R2, and R3 results in the induced terminal voltage signals Va, Vb, and Vc read at the winding taps 32a–32c having a distinguishable zero-crossing. When a voltage signal V is below zero, it is clamped by the diodes D to approximately −0.7 volts, thus flattening the negative portion of the sinusoidal waveform illustrated in FIGS. 3a–3b.

To determine the direction of freewheeling rotation, the controller 40 reads the values of Va, Vb, and Vc. If these signals all equal zero, there is no freewheeling rotation of the motor. If not all the voltage signals V equal zero, the motor 30 is rotating and the controller 40 determines the rotation direction by determining the sequence of the induced terminal voltage signals Va, Vb, and Vc. For example, referring to FIG. 5, when Va is at rising-edge zero crossing, if Vb<0, and Vc>0, the voltage signal sequence is A-B-C and the motor 30 is rotating in the A-B-C direction. But, if Vb>0 and Vc<0, the motor is rotating in an opposite A-C-B direction. If the rotation is the desired direction, then the controller 40 picks up the motor 30 speed by commutating the windings. But if the rotation is in the opposite direction, then the controller 40 brakes the motor and executes a start-up routine to begin rotation in the desired direction.

Figure 6:
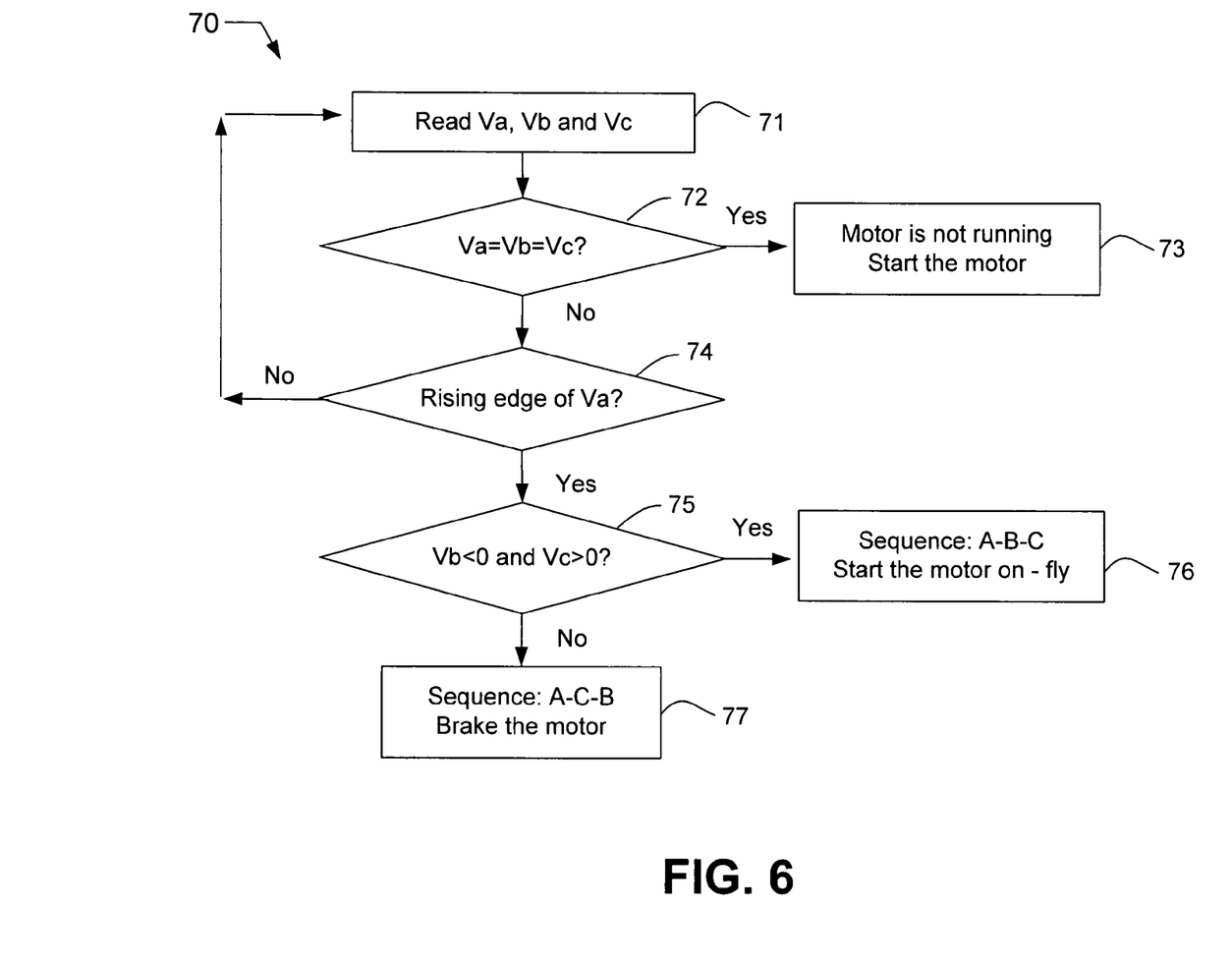
FIG. 6 is a flow chart of a technique for determining a freewheeling rotation of the motor of FIG. 4 by comparing features of the induced voltage signals Va, Vb, and Vc generated by the motor when freewheeling, according to an embodiment of the invention.

FIG. 6 is a flow chart 70 for determining the freewheeling direction of the motor 30 of FIG. 4 by comparing the induced voltage signals Va, Vb, and Vc according to an embodiment of the invention. After a start, the logical flow begins at block 71 where the controller 40 reads the induced voltage signals Va, Vb, and Vc. Next, at decision block 72, the controller 40 compares the induced voltage signals Va, Vb, and Vc to determine whether they are equal, which case they all would be zero. If these voltage signals are equal, then the controller 40 at block 73 determines that the motor 30 is not freewheeling or otherwise rotating, and the controller 40 starts the motor 30 with a conventional start-up routine. But if the induced signals are not equal, the logical flow moves to decision block 74 where the controller 40 "looks for" a rising-edge zero-crossing of Va. If a zero-crossing rising edge of Va is not detected, then the logical flow moves back to the block 71. If a Va zero-crossing rising edge is present, the logical flow moves to decision block 75. At decision block 75, the controller 40 determines Whether Vb<0 and Vc>0. If this condition exists, at block 76 the controller 40 determines that the motor 30 is rotating in the desired A-B-C direction and allows the rotation in the first direction to continue and starts the motor "on the fly." If Vb>0 or Vc<0, the logical flow moves to block 77 where the controller 40 determines the that the motor is rotating in the undesired sequence A-C-B direction. Consequently, at block 77, the controller 40 breaks the motor 30 until it stops and then executes a conventional start-up routine to start the motor 30 rotating in the desired A-C-B direction.

As discussed above, circuitry operable to perform the operations of the flow diagram 70 may be incorporated in the controller 40. Alternatively, this circuitry may be associated with the motor system 60 (FIG. 4). Further, the logic may be implemented in hardware, software, or a combination thereof. Moreover, while the logical flow chart 70 uses the signal Va as the reference signal from which rotation is determined, Vb or Vc can be used to determine rotation with the flow chart 70 being revised accordingly.

Figure 7:
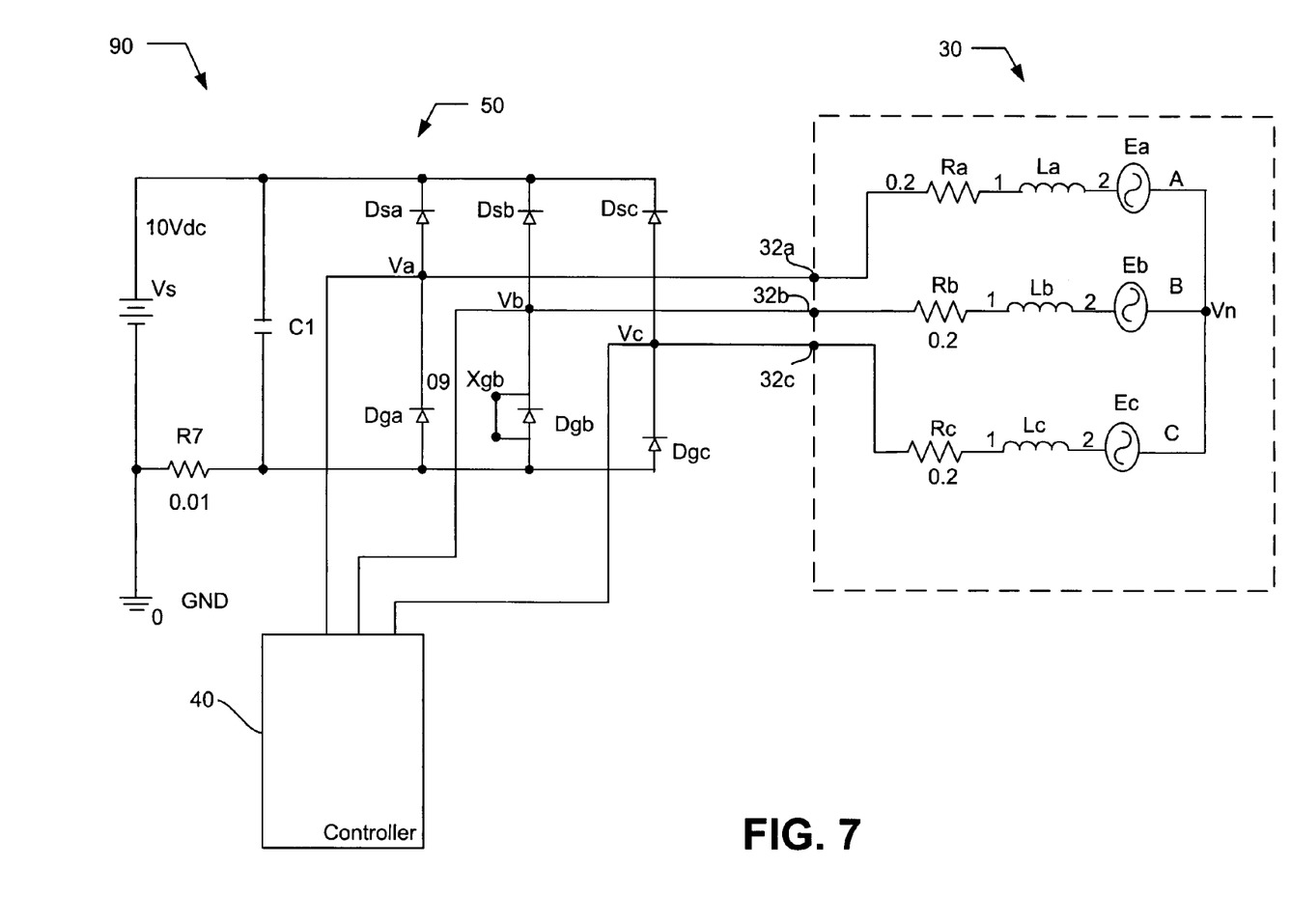
FIG. 7 is a model of the motor system of FIG. 2 where a coil drive switch is turned on to determine the freewheeling direction of the motor according to an embodiment of the invention.

FIG. 7 is a schematic model of a motor system 90 in a state where a single "bottom switch," such as switch Xgb is turned on while the motor 30 is freewheeling according to an embodiment of the invention. The motor system 90 is similar to the motor system 20 of FIG. 2 and in the same unenergized state except that one of the bottom (ground side) switches is turned on. FIG. 7 illustrates another embodiment of the invention for determining the freewheeling direction of the motor 30 by reading induced voltage signals without the R1, R2, and R3 of FIG. 4.

Figure 8:
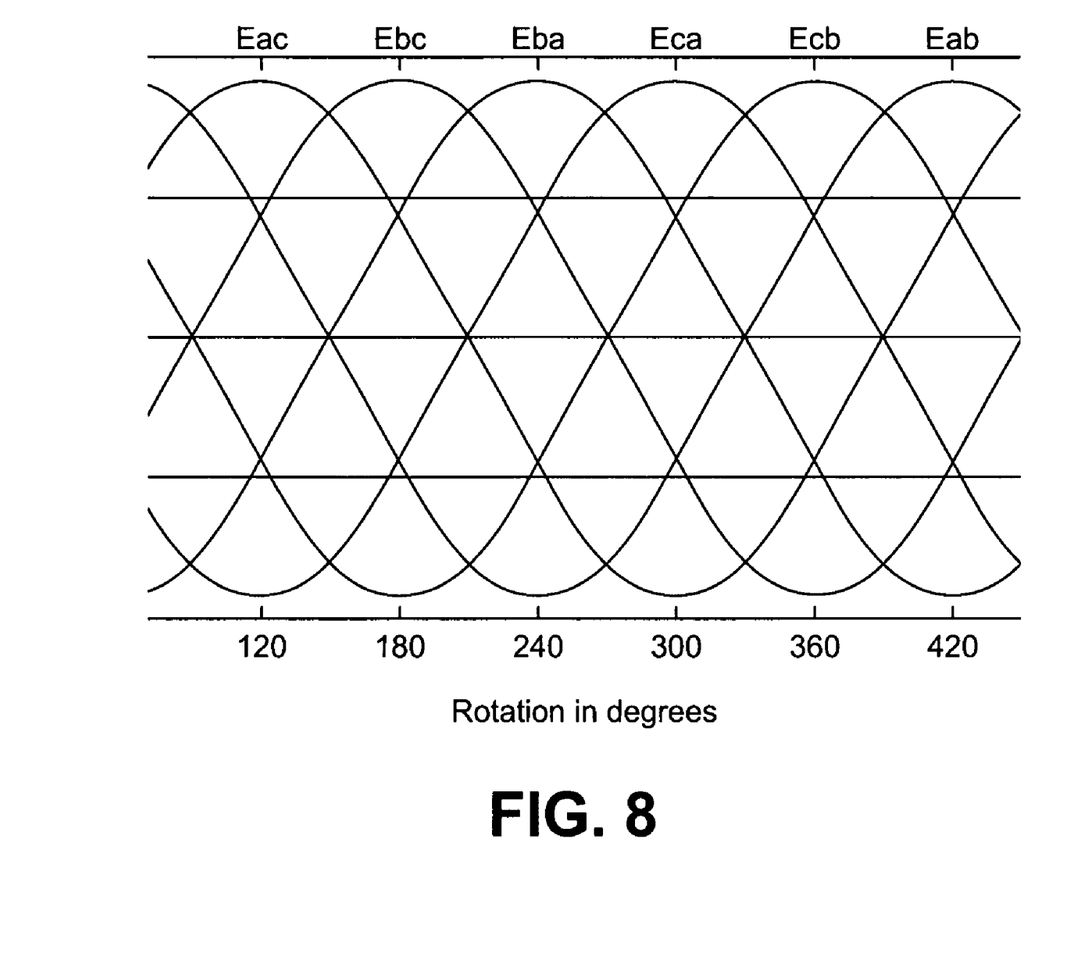
FIG. 8 is a plot of a freewheeling induced sinusoidal tap voltages Eab, Eac, Ebc, Eba, Eca, and Ecb of the motor system of FIG. 7 according to an embodiment of the invention.
Figure 9:
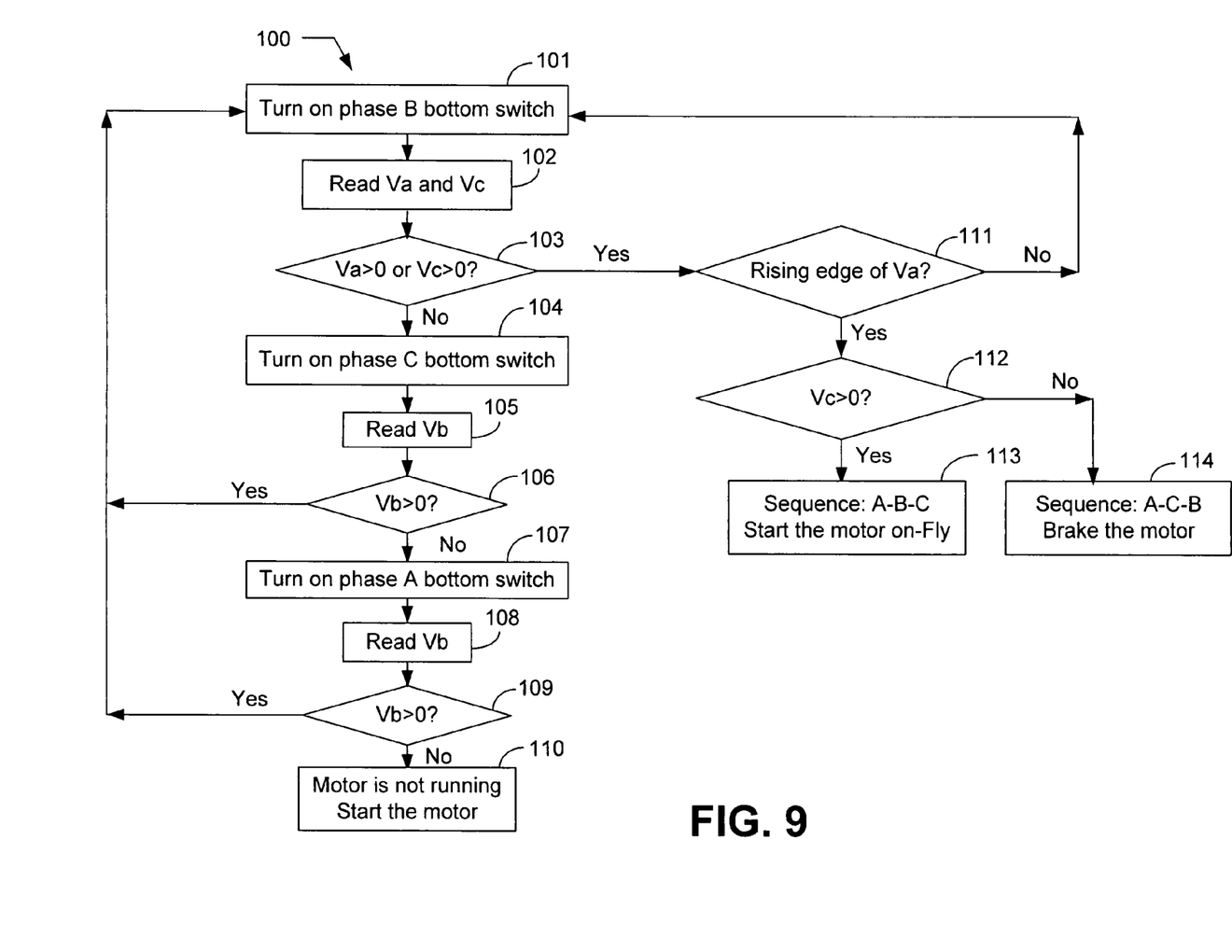
FIG. 9 is a logical flow chart of a technique for determining a freewheeling direction of the motor of FIG. 7 according to an embodiment of the invention.

When one of the bottom switches Xga, Xgb, or Xgc (such as Xgb shown in FIG. 7) is turned on while all the upper switches are off, a line-to-line signal voltage with respect to two windings can be measured. For example, when bottom switch Xgb is turned on by the controller 40, Vb is at zero or ground GND. In this state with no current flowing through the windings, signal voltage Va=Ea−Eb=Eab, and signal voltage Vc=Ec−Eb=Ecb. Similarly, turning on bottom switch Xga results in signal voltage Vb=Eb−Ea=Eba and signal voltage Vc=Ec−Ea=Eca. Further, turning on bottom switch Xgc results in signal voltage Vb=Eb−Ec=Ebc, and signal voltage Va=Ea−Ec=Eac. These line-to-line voltages will be sinusoidal and be spaced approximately 60 degrees as illustrated by FIG. 8, which is a plot of a freewheeling induced sinusoidal tap voltages Eab, Eac, Ebc, Eba, Eca, and Ecb of the motor system of FIG. 7 according to an embodiment of the invention;

FIG. 9 shows a flow chart 100 for the rotation direction of the motor 30 by comparing features of the induced line-to-line voltage signals Va, Vb, and Vc generated by the motor 60 when freewheeling, according to an embodiment of the invention. After a start, the logical flow begins at block 101 where the controller 40 turns on the switch Xgb to ground winding B such that Vb=0. Next, the logical flow moves to block 102 where the controller 40 reads the induced line-to-line voltage signals Va=Eab and Vc=Ecb are read.

Moving to decision block 103, if either Va>0 or Vb>0, the logical flow proceeds to decision block 111. Otherwise, the logical flow proceeds to block 104.

At logical block 104, the controller 40 turns off the switch Xgb and turns on the bottom switch Xgc to ground the winding C, such that Vc=0. Next at block 105, the induced line-to-line voltage signal Vb=Ebc is read. The logical flow moves to decision block 106. If Vb>0, the logical flow returns to block 101, otherwise the logical flow moves to block 107. At logical block 107, the controller 40 turns off the switch Xgc and turns on the bottom switch Xga to ground the winding A, such that Va=0. Next at block 108, the controller 40 reads Vb. Moving to decision block 109, if Vb>0, the logical flow returns to block 101. Otherwise, the logical flow moves to logical block 110 where the controller 40 determines that the motor 30 is not rotating. Consequently, the controller 40 starts the motor 30 in the desired direction by executing a conventional the start-up routine.

If the logical flow moved from decision block 103 to decision block 111 in response to either Va>0 or Vb>0, the controller 40 tries to detect the rising-edge zero crossing of Va. If the controller detects a rising-edge zero-crossing of Va, then the logical flow moves to decision block 112; otherwise it returns to block 101. At decision block 112, the controller 40 determines whether Vc>0. If this condition exists, then the logical flow moves to block 113 where the controller 40 determines that the motor 30 is rotating in the desired A-B-C direction and starts the motor on-the-fly. If this condition does not exist, then the logical flow moves to block 114, where the controller 40 determines that the motor 30 is rotating in the undesired A-C-B direction, and thus brakes the motor and then executes the start up routine to start the motor rotating in the desired A-B-C direction. While the flow chart 100 begins by grounding the B winding as an initial step in determining rotation, any other winding may be grounded in the initial step to determine rotation with the flow chart 100 being revised accordingly.

Figure 10:
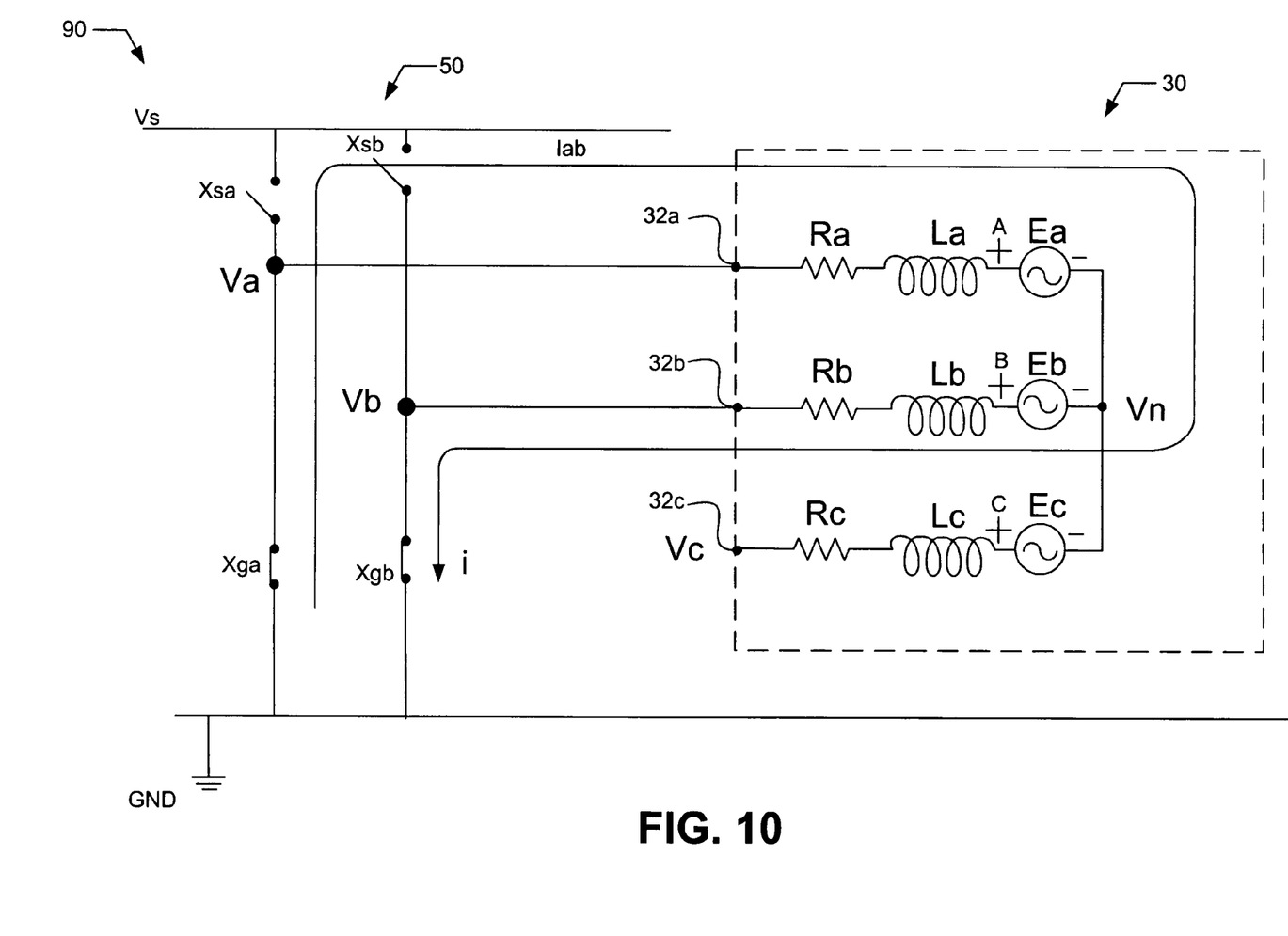
FIG. 10 is a model of the motor system of FIG. 2 where two bottom coil drive switches are turned on to determine the freewheeling direction of the motor according to an embodiment of the invention.

FIG. 10 is a schematic model of the motor system 90 of FIG. 7 in a state where two bottom switches X (illustrated as switches Xga and Xgb in this example) are turned on while the upper switches are turned off, i.e, the motor 30 is unenergized because it is not being driven by the controller 40, according to an embodiment of the invention. FIG. 10 illustrates yet another embodiment of the invention for determining a freewheeling direction of the motor 30. When the two bottom switches Xga and Xgb are turned on without otherwise driving the motor 30, an induced current Iab is created through the windings A and B when the motor 30 is freewheeling. The current Iab will flow in either direction depending on the phase sequence. The signal voltage Vc of the floating winding C at winding tap 32c is a sum of Ec+Vn, where Ec is the voltage induced by winding C when the motor 30 is freewheeling and a voltage at node Vn. The following equations show the signal voltage Vat any of the winding taps is a sinusoidal waveform similar to those illustrated in FIG. 3a.

From winding A, we have $$v_n = 0 - ri - L\frac{di}{dt} - E_a \tag{1}$$

From winding B, $$v_n = ri + L\frac{di}{dt} - E_b \tag{2}$$

Adding (1) and (2), we get $$v_n = -\frac{E_a + E_b}{2} \tag{3}$$

Also from the balance three-phase system, we know $$E_a + E_b + E_c = 0 \tag{4}$$

From (3) and (4), $$v_n = \frac{E_c}{2} \tag{5}$$

So, the induced signal voltage Vc may be expressed as, $$v_c = E_c + v_n = \frac{3}{2}E_c \tag{6}$$

Therefore, when bottom switches Xgb and Xgc are turned on, the induced signal voltage Va equals 3/2*Ea. Similarly, when bottom switches Xga and Xgc are turned on, the induced signal voltage Vb equals 3/2*Eb. These signal voltages V are sinusoidal and spaced approximately 120 degrees as described in conjunction with FIG. 3a.

Determination of a freewheeling rotation of the motor 30 of FIG. 10 is performed using the logical flow chart 70 of FIG. 6. The bottom switches Xga, Xgb, and Xgc are appropriately switched on in pairs by the controller 40 for reading the induced signal voltages Vas appropriate.

It should be further noted that although preferred embodiments of the invention are described with referenced to a three-phase brushless DC motor, other embodiments may equally advantageously applied to polyphase permanent magnet AC motors in general.

From the foregoing it will be appreciated that, although specific embodiments of the invention have been described herein for purposes of illustration, various modifications may be made without deviating from the spirit and scope of the invention.

What is claimed is:

1. A method, comprising:
    measuring first, second, and third signals from respective simultaneously unenergized first, second, and third windings of a motor, the first, second, and third signals having respective first, second, and third phases;
    determining that the motor is rotating in a direction if the second phase leads the first phase and the third phase lags the first phase; and
    determining that the motor is rotating in an opposite direction if the second phase lags the first phase and the third phase leads the first phase.

2. The method of claim 1, further comprising determining from the first, second, and third signals whether the motor is rotating.

3. The method of claim 1 wherein the first, second, and third signals each comprise a respective emf back voltage.

4. The method of claim 1, further comprising determining that the motor is not rotating if the first, second, and third signals are equal.

5. The method of claim 1 wherein measuring the first and second signals comprises grounding the third winding of the motor while measuring the first and second signals.

6. The method of claim 1 wherein measuring the first and second signals comprises pulling the first and second windings to ground through an impedance element while measuring the first and second signals.

7. A method, comprising:
    measuring first, second, and third signals from respective simultaneously unenergized first, second, and third windings of a motor;

if the motor is rotating, determining from the first, second, and third signals the direction in which the motor is rotating; and wherein measuring the first and second signals comprises, grounding the second winding and the third winding of the motor while measuring the first signal, and grounding the first and third windings while measuring the second signal.

8. A method, comprising:

measuring first, second, and third signals from a respective first, second, and third windings of a plurality of simultaneously unenergized windings of a motor;

determining the motor is not rotating if the first, second, and third signals are equal, otherwise;

determining the motor is rotating in a first direction if, at a rising-edge zero-crossing of the first signal, the second signal is less than zero and the third signal is more than zero, otherwise; and determining the motor is rotating in a second direction if, at a rising-edge zero-crossing of the first signal, the second signal is more than zero and the third signal is less than zero.

9. The method of claim 8, wherein the measuring step further includes a step of pulling the first, second, and third windings to ground through respective first, second, and third impedance elements while measuring the first, second, and third signals across the respective impedance elements.

10. The method of claim 8, wherein the measuring step further includes steps of:

grounding the second winding while measuring the first signal and the third signal;

grounding the third winding while measuring the first signal and the second signal; and grounding the first winding while measuring the second signal and the third signal.

11. The method of claim 8, wherein the measuring step further includes steps of:

grounding the second winding and the third winding while measuring the first signal;

grounding the third winding and the first winding while measuring the second signal; and grounding the first winding and the second winding while measuring the third signal.

12. A controller, operable to:

measure first, second, and third signals from respective first, second, and third simultaneously unenergized windings of a motor, the first, second, and third signals having respective first, second, and third phases;

determine that the motor is rotating in a direction if the second phase leads the first phase and the third phase lags the first phase; and determine that the motor is rotating in an opposite direction if the second phase lags the first phase and the third phase leads the first phase.

13. The controller of claim 12, wherein the controller is further operable to determine from the first, second, and third signals whether the motor is rotating.

14. The controller of claim 12, wherein the controller is further operable to determine that the motor is not rotating if the first, second, and third signals are equal.

15. The controller of claim 12, wherein the controller is further operable to measure the first and second signals respectively across first and second impedance elements that respectively pull the first and second windings to ground.

16. A controller, operable to:

measure first, second, and third signals from respective first, second, and third simultaneously unenergized windings of a motor;

if the motor is rotating, determine from the first, second, and third signals the direction in which the motor is rotating; and wherein the controller is further operable to close a switch that grounds the third winding of the motor while measuring the first and second signals.

17. A controller, operable to:

measure first, second, and third signals from respective first, second, and third simultaneously unenergized windings of a motor;

if the motor is rotating, determining from the first, second, and third signals the direction in which the motor is rotating; and wherein the controller is further operable to, close a second switch that grounds the second winding and a third switch that grounds the third winding of the motor while measuring the first signal, and close a first switch that grounds the first winding and the third switch that grounds the third winding while measuring the second signal.

18. A motor system, comprising:

an electric motor having first, second, and third windings;

a controller operable, when the first, second, and third windings are simultaneously unenergized, to:

measure first, second, and third signals from the respective first, second, and third windings, the first, second, and third signals having respective first, second, and third phases, determine that the motor is rotating in a direction if the second phase leads the first phase and the third phase lags the first phase, and determine that the motor is rotating in an opposite direction if the second phase lags the first phase and the third phase leads the first phase.

19. The motor system of claim 18, wherein the controller is further operable to determine from the first, second, and third signals whether the motor is rotating.

20. The motor system of claim 18, wherein the controller is further operable to determine that the motor is not rotating if the first, second, and third signals are equal.

21. The motor system of claim 18, wherein:

the motor system further includes first, second, and third impedance elements that respectively pull the first, second, and third windings to ground; and the controller is further operable to measure the first, second, and third signals respectively across the first, second, and third impedance elements.

22. A motor system, comprising:

an electric motor having first, second, and third windings;

a controller operable when the first, second, and third windings are simultaneously unenergized to, measure first, second, and third signals from the respective first, second, and third windings, and if the motor is rotating, determine from the first, second, and third signals the direction in which the motor is rotating;

a power-supply control circuit having a switch that grounds the third winding; and wherein the controller is further operable to close the switch while measuring the first and second signals.

23. A motor system, comprising:
an electric motor having first, second, and third windings;
a controller operable when the first, second, and third windings are simultaneously unenergized to,
   measure first, second, and third signals from the respective first, second, and third windings, and
   if the motor is rotating, determine from the first, second, and third signals the direction in which the motor is rotating;
a power supply control circuit having first, second, and third switches that respectively ground the first, second, and third windings of the motor; and
wherein the controller is further operable to,
   close the second and third switches while measuring the first signal, and
   close the first and third switches while measuring the second signal.

24. The motor system of claim 18, further comprising:
wherein the motor further comprises a shaft; and
a plurality of fan blades coupled to the shaft.

25. A vehicle, comprising:
a motor system, comprising,
   an electric motor having first, second, and third windings, and
   a controller operable, when the first, second, and third windings are simultaneously unenergized, to,
      measure first, second, and third signals from the respective first, second, and third windings, the first, second, and third signals having respective first, second, and third phases,
      determine that the motor is rotating in a direction if the second phase leads the first phase and the third phase lags the first phase, and
      determine that the motor is rotating in an opposite direction if the second phase lags the first phase and the third phase leads the first phase.

26. A method, comprising:
measuring first, second, and third signals from respective simultaneously unenergized first, second, and third windings of a motor;
if the motor is rotating, determining from the first, second, and third signals the direction in which the motor is rotating;
if the motor is rotating in a first direction,
   braking the motor, and
   after braking the motor, energizing the first, second, and third windings such that the motor rotates in a second direction that is opposite to the first direction; and
if the motor is rotating in the second direction, energizing the first, second, and third windings without first braking the motor such that the motor continues to rotate in the second direction.

27. A method, comprising:
measuring first, second, and third signals from respective simultaneously unenergized first, second, and third windings of a motor;
if the motor is rotating, determining from the first, second, and third signals the direction in which the motor is rotating;
if the motor is rotating in a first direction,
   braking the motor until the motor stops rotating, and
   after braking the motor, energizing the first, second, and third windings such that the motor rotates in a second direction that is opposite to the first direction; and
if the motor is rotating in the second direction, energizing the first, second, and third windings without first stopping the motor such that the motor continues to rotate in the second direction.

28. A controller, operable to:
measure first, second, and third signals from respective first, second, and third simultaneously unenergized windings of a motor;
if the motor is rotating, determine from the first, second, and third signals the direction in which the motor is rotating;
if the motor is rotating in a first direction,
   brake the motor, and
   after braking the motor, energize the first, second, and third windings such that the motor rotates in a second direction that is opposite to the first direction; and
if the motor is rotating in the second direction, energize the first, second, and third windings without first braking the motor such that the motor continues to rotate in the second direction.

29. A controller, operable to:
cause a motor to rotate in a first direction by energizing first, second, and third windings in a first predetermined sequence;
cause the motor to rotate in a second direction by energizing the first, second, and third windings in a second predetermined sequence;
simultaneously deenergize the first, second, and third windings;
measure first, second, and third signals from the respective first, second, and third simultaneously unenergized windings of the motor; and
if the motor is rotating, determine from the first, second, and third signals the direction in which the motor is rotating.

30. A method, comprising:
causing a motor to rotate in a first direction by energizing first, second, and third windings in a first predetermined sequence;
causing the motor to rotate in a second direction by energizing the first, second, and third windings in a second predetermined sequence;
simultaneously deenergizing the first, second, and third windings;
measuring first, second, and third signals from the respective first, second, and third simultaneously unenergized windings of the motor; and
if the motor is rotating, determining from the first, second, and third signals the direction in which the motor is rotating.

31. A method, comprising:
measuring first, second, and third signals from respective simultaneously unenergized first, second, and third windings of a motor;
determining that the motor is rotating in a direction if, at a zero crossing of the first signal, the second signal has a polarity and the third signal has an opposite polarity; and
determining that the motor is rotating in an opposite direction if, at the zero crossing of the first signal, the second signal has the opposite polarity and the third signal has the polarity.

32. The method of claim 31, further comprising determining that the motor is not rotating if the first, second, and third signals are equal.

* * * * *